US009569442B2

(12) United States Patent
Caudle et al.

(10) Patent No.: US 9,569,442 B2
(45) Date of Patent: *Feb. 14, 2017

(54) GEO-LOCATION VIDEO ARCHIVE SYSTEM AND METHOD

(71) Applicant: AFIX Technologies, Inc., Pittsburg, KS (US)

(72) Inventors: Derald E. Caudle, Pittsburg, KS (US); Joan L. Vitt, Parsons, KS (US)

(73) Assignee: The Radiant Group, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,808

(22) Filed: Apr. 6, 2015

(65) Prior Publication Data

US 2015/0213031 A1 Jul. 30, 2015

Related U.S. Application Data

(63) Continuation-in-part of application No. 14/532,957, filed on Nov. 4, 2014, which is a continuation of
(Continued)

(51) Int. Cl.
*H04N 5/77* (2006.01)
*G06F 17/30* (2006.01)
(Continued)

(52) U.S. Cl.
CPC ... *G06F 17/30073* (2013.01); *G06F 17/30017* (2013.01); *G06F 17/3082* (2013.01);
(Continued)

(58) Field of Classification Search
USPC ......... 709/231; 726/2, 21, 36; 713/150, 163, 713/181; 380/255, 264, 276
See application file for complete search history.

(56) References Cited

U.S. PATENT DOCUMENTS 3,558,864 A 1/1971 French
3,699,519 A 10/1972 Campbell
(Continued)

OTHER PUBLICATIONS

"AFIX Products Overview", http://www.afixtechnologies.com/newsite2006/afix-products.html, Nov. 2006.
(Continued)

*Primary Examiner* — Abu Sholeman
*Assistant Examiner* — Sharif E Ullah
(74) *Attorney, Agent, or Firm* — Law Office of Mark Brown, LLC; Mark E. Brown; Christopher M. DeBacker

(57) ABSTRACT

A system and method for recording, uploading, and archiving video recordings, including a front-end and a back-end application. The preferred embodiment of the present invention includes a front-end application wherein video is recorded using a mobile device. The recorded video is embedded with date, time and GPS location data. The video is stored on an online back-end database which catalogs the video according to the embedded data elements. The video may be selectively reviewed by relevant experts or emergency personnel for immediate response to the uploaded video and/or distribution to the proper parties. The video may also be archived for later review and use by any number of end-users.

15 Claims, 9 Drawing Sheets

Related U.S. Application Data application No. 13/412,359, filed on Mar. 5, 2012, now Pat. No. 8,880,718.

(60) Provisional application No. 61/448,997, filed on Mar. 3, 2011.

(51) Int. Cl.

| | | |
|---|---|---|
| H04N 5/91 | (2006.01) | |
| H04N 13/00 | (2006.01) | |
| G11B 27/10 | (2006.01) | |
| H04N 21/258 | (2011.01) | |
| H04N 21/414 | (2011.01) | |
| H04N 21/658 | (2011.01) | |
| H04L 29/06 | (2006.01) | |
| H04N 21/2747 | (2011.01) | |
| H04N 21/2743 | (2011.01) | |
| H04N 21/422 | (2011.01) | |
| H04N 21/4223 | (2011.01) | |
| G11B 27/32 | (2006.01) | |
| H04N 5/765 | (2006.01) | |
| H04N 9/82 | (2006.01) | |

(52) U.S. Cl.
CPC ............ *G11B 27/10* (2013.01); *G11B 27/105* (2013.01); *G11B 27/322* (2013.01); *H04L 65/60* (2013.01); *H04N 5/765* (2013.01); *H04N 5/77* (2013.01); *H04N 5/91* (2013.01); *H04N 9/8205* (2013.01); *H04N 13/0055* (2013.01); *H04N 21/25841* (2013.01); *H04N 21/2743* (2013.01); *H04N 21/2747* (2013.01); *H04N 21/41407* (2013.01); *H04N 21/4223* (2013.01); *H04N 21/42202* (2013.01); *H04N 21/6582* (2013.01)

(56) References Cited

U.S. PATENT DOCUMENTS

| | | | |
|---|---|---|---|
| 3,893,080 | A | 7/1975 | Ho et al. |
| 4,015,240 | A | 3/1977 | Swonger et al. |
| 4,156,230 | A | 5/1979 | Riganati et al. |
| 4,210,899 | A | 7/1980 | Swonger et al. |
| 4,310,827 | A | 1/1982 | Asai |
| 4,696,046 | A | 9/1987 | Schiller |
| 4,747,147 | A | 5/1988 | Sparrow |
| 4,790,564 | A | 12/1988 | Larcher et al. |
| 4,817,183 | A | 3/1989 | Sparrow |
| 4,896,363 | A | 1/1990 | Taylor et al. |
| 4,944,021 | A | 7/1990 | Hoshino et al. |
| 4,947,442 | A | 8/1990 | Tanaka et al. |
| 4,947,443 | A | 8/1990 | Costello |
| 5,040,223 | A | 8/1991 | Kamiya et al. |
| 5,040,224 | A | 8/1991 | Hara |
| 5,067,162 | A | 11/1991 | Driscoll, Jr. et al. |
| 5,105,467 | A | 4/1992 | Kim et al. |
| 5,109,428 | A | 4/1992 | Igaki et al. |
| 5,187,747 | A | 2/1993 | Capello et al. |
| 5,239,590 | A | 8/1993 | Yamamoto |
| 5,420,937 | A | 5/1995 | Davis |
| 7,613,929 | B2 | 11/2009 | Cohen et al. |
| 8,036,431 | B1 | 10/2011 | Fisher et al. |
| 8,676,658 | B2 | 3/2014 | Marcus et al. |
| 8,880,718 | B2 | 11/2014 | Caudle et al. |
| 2002/0038357 | A1 | 3/2002 | Haverstock et al. |
| 2003/0081934 | A1* | 5/2003 | Kirmuss ............... B60R 11/02 386/224 |
| 2003/0085992 | A1* | 5/2003 | Arpa .................... G06T 7/0024 348/47 |
| 2004/0167929 | A1 | 8/2004 | Osborne et al. |
| 2005/0257157 | A1 | 11/2005 | Gilboa et al. |
| 2006/0285832 | A1* | 12/2006 | Huang ............... H04N 13/0048 386/210 |
| 2009/0138813 | A1 | 5/2009 | Lamontagne |
| 2011/0076993 | A1* | 3/2011 | Stephens ............... G06Q 10/10 455/414.1 |

OTHER PUBLICATIONS

"AFIX VP", http://www.afix.net/newsite2006/afix-vp.html, Nov. 2006.
"Microsoft Office Visio Professional 2007 Getting Started Screen".
Adobe, "Adobe Photoshop CS2 Brochure", 2005, pp. 1-5.
aware.com, "NITSPack SDK brochure", Aug. 2007, 1 page.
Federal Bureau of Investigation, "Electronic Fingerprint Transmission Specification (EFTS)", May 2, 2005, 216 pages.
Jiang, et al., "Fingerprint Minutiae Matching Based on the Local and Golbal Structures", 2000, 1038-1041.
Mitretek, "How AFIS Selection Was Performed for IAFIS", Apr. 6, 2006, pp. 1-20.
Reddy, "Visio/IronPython/Powershell—How to draw nice diagrams from the command line", http://blogs.msdn.com/b/saveenr/archive/2009/01/22/visio-ironpython-powershell-how-to-draw-nice-diagrams-from-the-command-line.aspx, Jan. 22, 2009.

\* cited by examiner

GEO-LOCATION VIDEO ARCHIVE SYSTEM AND METHOD

CROSS-REFERENCE TO RELATED APPLICATIONS

This application is a continuation-in-part of and claims priority in U.S. patent application Ser. No. 14/532,957, filed Nov. 4, 2014, which is a continuation of and claims priority in U.S. patent application Ser. No. 13/412,359, filed Mar. 5, 2012, now U.S. Pat. No. 8,880,718, issued Nov. 4, 2014, which claims priority in U.S. Provisional Patent Application Ser. No. 61/448,997, filed Mar. 3, 2011, and is related to U.S. patent application Ser. No. 13/412,512, filed Mar. 5, 2012, which claims priority in U.S. Provisional Patent Application Ser. No. 61/448,972, filed Mar. 3, 2011, and is also related to U.S. patent application Ser. No. 13/095,601, filed Apr. 27, 2011, which claims priority in U.S. Provisional Patent Application Ser. No. 61/328,305, filed Apr. 27, 2010, all of which are incorporated herein by reference.

BACKGROUND OF THE INVENTION

1. Field of the Invention

The present disclosed technology relates generally to a system and method for recording, uploading, and utilizing video recorded in real-time, and specifically to a front-end and back-end video archival system and method using video recorded in real-time to aid in emergency or weather response.

2. Description of the Related Art

Digitally watermarking or embedding data into recorded video is well known in the art. Modern mobile phones, digital cameras, and other mobile devices are capable of recording video anywhere a user is located, and uploading that video to common video archive websites, such as youtube.com. These mobile devices may also include GPS functionality, allowing the video to be tagged with location data and other relevant data so that anyone who ultimately views the video can determine where and when a video was taken.

Presently, such mobile user-submitted videos may be uploaded to video archival or video sharing networks, but the value of the embedded video data is typically underused. For instance, a video may be uploaded to a publicly available video archive database where numerous end users are able to view the video, but the video may not be used immediately and the relevance of the time and location of the video that has been uploaded loses value.

Typical video archive databases either include embedded video data as an afterthought, or limit the access of that data to selected users. One such example of selective use of video data is U.S. Pat. No. 7,633,914 to Shaffer et al. (the '914 patent). Although video data may be uploaded and used for assessing critical security or other means in the geographic area of the video data, the '914 patent relies on users who have already accessed "virtual talk groups" to upload relevant video data. That video data is then only immediately accessible to members of the same virtual talk groups, which limits the effectiveness of the video data to a small number of users.

Embedded video or photograph data is also used by police departments for accurate evidence collection. U.S. Pat. No. 7,487,112 to Barnes, Jr. (the "112 patent") describes this ability, but limits the use of the uploaded video or photographic data to the police department. Video or photographic data uploaded to the collection server is stored and not immediately used in any capacity. Such a technique merely simplifies the tasks of a police officer during evidence collection and does not fully embrace the value of embedded video data.

What is needed is a system which provides mobile users the ability to record video with embedded data, upload that video to a commonly accessible database where the video may be immediately reviewed, and any particular value that can be gathered from the uploaded video be submitted to emergency crews or other relevant parties for immediate review of the recently uploaded video. Heretofore there has not been a video archival system or method with the capabilities of the invention presented herein.

SUMMARY OF THE INVENTION

Disclosed herein in an exemplary embodiment is a system and method for uploading and archiving video recordings, including a front-end and a back-end application.

The preferred embodiment of the present invention includes a front-end application wherein video is recorded using a mobile device. The recorded video is embedded with date, time and GPS location data.

The video is stored on an online back-end database which catalogues the video according to the embedded data elements. The video may be selectively reviewed by relevant experts or emergency personnel for immediate response to the uploaded video and/or distribution to the proper parties. The video may also be archived for later review and use by any number of end-users.

An alternative embodiment includes the ability to reconstruct or recreate a virtual three-dimensional space from recorded video and audio of a scene or event, taken from multiple angles. At least three angles would be needed for a three-dimensional recreation, but additional angles improve the accuracy of the virtual space. This space can then be reviewed and analyzed, sounds can be replayed from multiple locations through the virtual space, and incidents can be recreated.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENTS

I. Introduction and Environment

Figure 1:
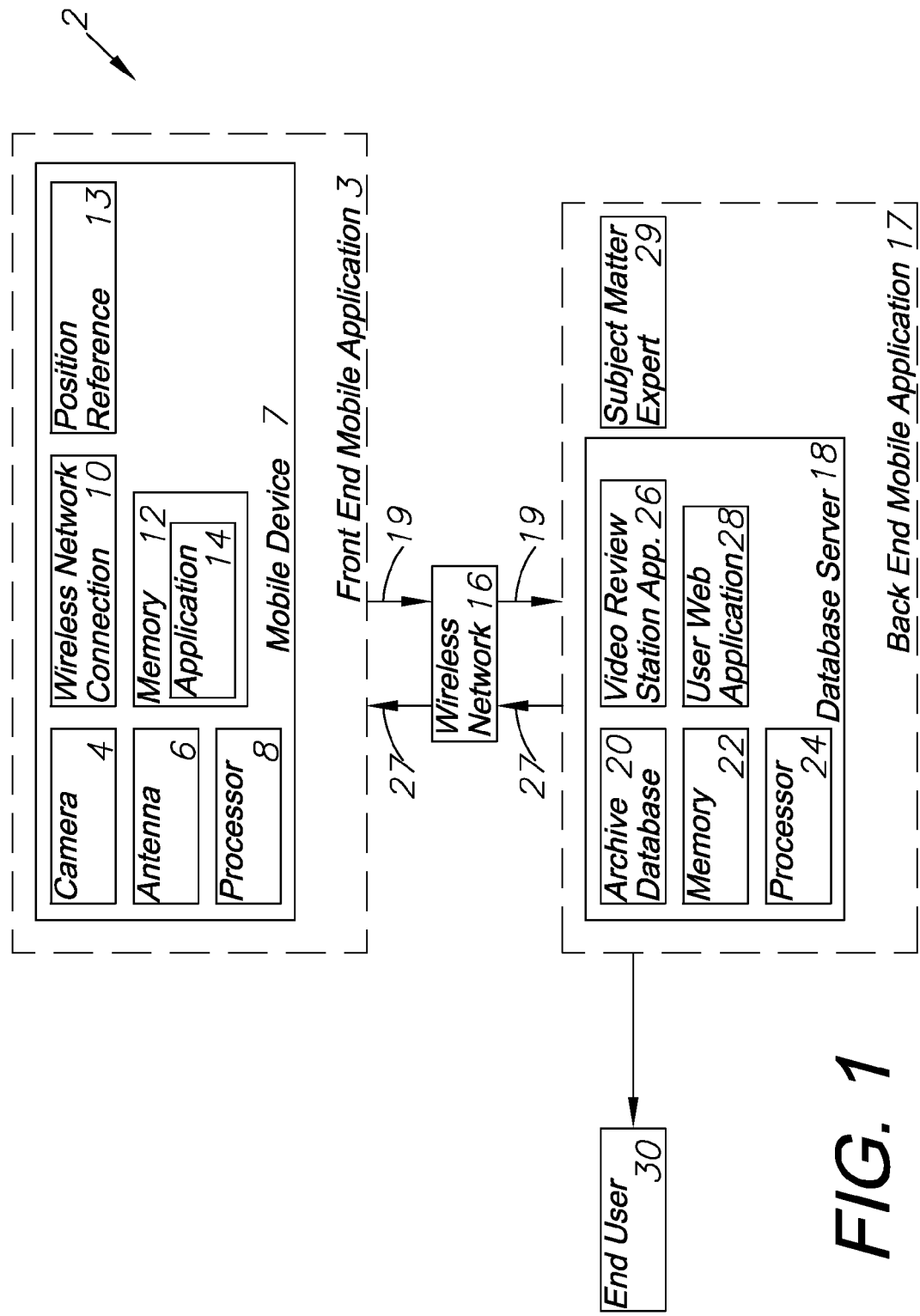
FIG. 1 is a block diagram showing the relationship between the various elements of the preferred embodiment of the present invention.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, a personal computer including a display device for viewing a typical web browser or user interface will be commonly referred to throughout the following description. The type of computer, display, or user interface may vary when practicing an embodiment of the present invention.

A preferred embodiment of the present invention relies on a front-end mobile application 3 associated with a mobile personal computing device 7, such as a mobile phone, personal digital assistant, or other hand-held computing-capable device. The mobile personal computing device 7 must access a wireless network 16. A back-end mobile application 17 may be accessed via any personal computing device with capable access to a network, such as the World Wide Web.

II. Geo-Location Video Archive System and Method

Referring to the drawings in more detail, reference numeral 2 generally refers to a geo-location video archive system, comprising a front-end mobile application 3, a back-end mobile application 17, and an end user 30.

FIG. 1 demonstrates the relationship between the front-end application 3, the back-end application 17, a wireless network 16, and an end user 30. The front-end application 3 is comprised of a mobile device 7. This mobile device 7 may be any hand held mobile device capable of recording and uploading video data via the wireless network 16 to a database server 18 utilized by the back-end application 17.

The mobile device 7 includes a camera 4 or other video capture ability capable of recording either still or video images, an antenna 6, a processor 8, a wireless network connection 10, a memory 12 storing an application 14, and a position reference 13.

The antenna 6 is capable of receiving and transmitting data over a wireless network 16, such as image data recorded by the camera 4. The processor 8 is adapted for processing all data required by the mobile device. The wireless network connection 10 allows the mobile device 7 to access the wireless network 16 for transmission and reception of data. The memory 12 stores all data necessary for the function of the mobile device 7, including image data recorded by the camera 4. An application 14 for accessing the back-end mobile application 17 via the wireless network 16 is stored on the memory. The position reference 13 includes optional two-dimensional or three-dimensional positional information about the mobile device 7. This positional reference 13 may optionally be attached to image data recorded with the camera 4.

The primary purpose of the mobile application 7 is to capture high resolution video by use of the mobile device's camera 4. The application 14 will collect video in one to ten second slices and transmit it with related data. This data may include Global Positioning System (GPS) location in the form of Longitude and Latitude, Date and Time stamp, description of up to 140 characters, as well as declination based upon magnetic or true north that will be packaged in an XML-formatted file with the phone's ID and a user name. Combined with the video slice, the mobile application will send a "packet" 19 to the database server 18.

The back-end mobile application 17 is comprised of a database server 18 which serves to receive all data submitted by mobile devices 7 included in the front-end application 3, and an optional subject matter expert (expert) 29 capable of reviewing submitted data for real-time use and organized archiving.

The database server 18 further includes an archive database 20, a memory 22, a processor 24, a video review station application 26 and a user web application 28. Image data and other data submitted to the database server 18 via the front-end mobile application 3 are stored in the archive database 20. The video review station application 26 is an optional feature that may be included for use by the expert 29 for reviewing submitted image data and other submitted data. The user web application 28 is an optional feature allowing end users 30 to access data uploaded to the database 18 for personal use.

Multiple mobile devices 7 may be incorporated with the front-end mobile application 7. Each front-end application may upload recorded data simultaneously to the database server 18. The database server 18 will receive a transmission packet 19 from various mobile devices 7. If this is a new transmission, the video slice and the metadata will be split from the transmission packet and saved into a storage folder located in the archive database 20. If the packet is a continuation of a current transmission, the video slice will be unpackaged from the packet, and merged with the previously received video slice. In addition the metadata transmitted with the packet will be merged with the current metadata XML. If this is the terminating packet, the video slice will be unpackaged from the packet, and merged with the previously received video slice. In addition, the metadata transmitted with the packet will be merged with the current metadata XML. Once complete, the video file and metadata will be saved into the archive database 20. Finally, a confirmation 27 of the received video can be sent to the mobile device 7, confirming that the video transmission was complete. In turn, this information may be made available to another application, web site, or other end user 30 for whatever needs it may have.

III. Database Video Upload, Review, and Use

In an embodiment of the present invention, an expert 29 will review video files uploaded to the database server 18 through the video review station application 26. The video review station application 26 will collect video from the front-end application 3. The application will gather the videos corresponding XML metadata and display the information for the expert 29. This will include items such as date, time, location, and video length. The expert 29 will then tag the event as a category that best describes the video (i.e. tornado, flood, thunder storm), apply search keywords, and modify the description as needed. The expert 29 will then, using a set of defined standards, grade the video, such as on a rating of one to five "stars." As examples, five stars may indicate: the highest quality video; video of devastating weather; or video meeting predefined quality definitions. At this time the video can be rejected if it does not meet video submission related requirements. Once this process has been completed, the expert 29 will save the video and corresponding XML to the proper database tables, making it available for searching.

Figure 2:
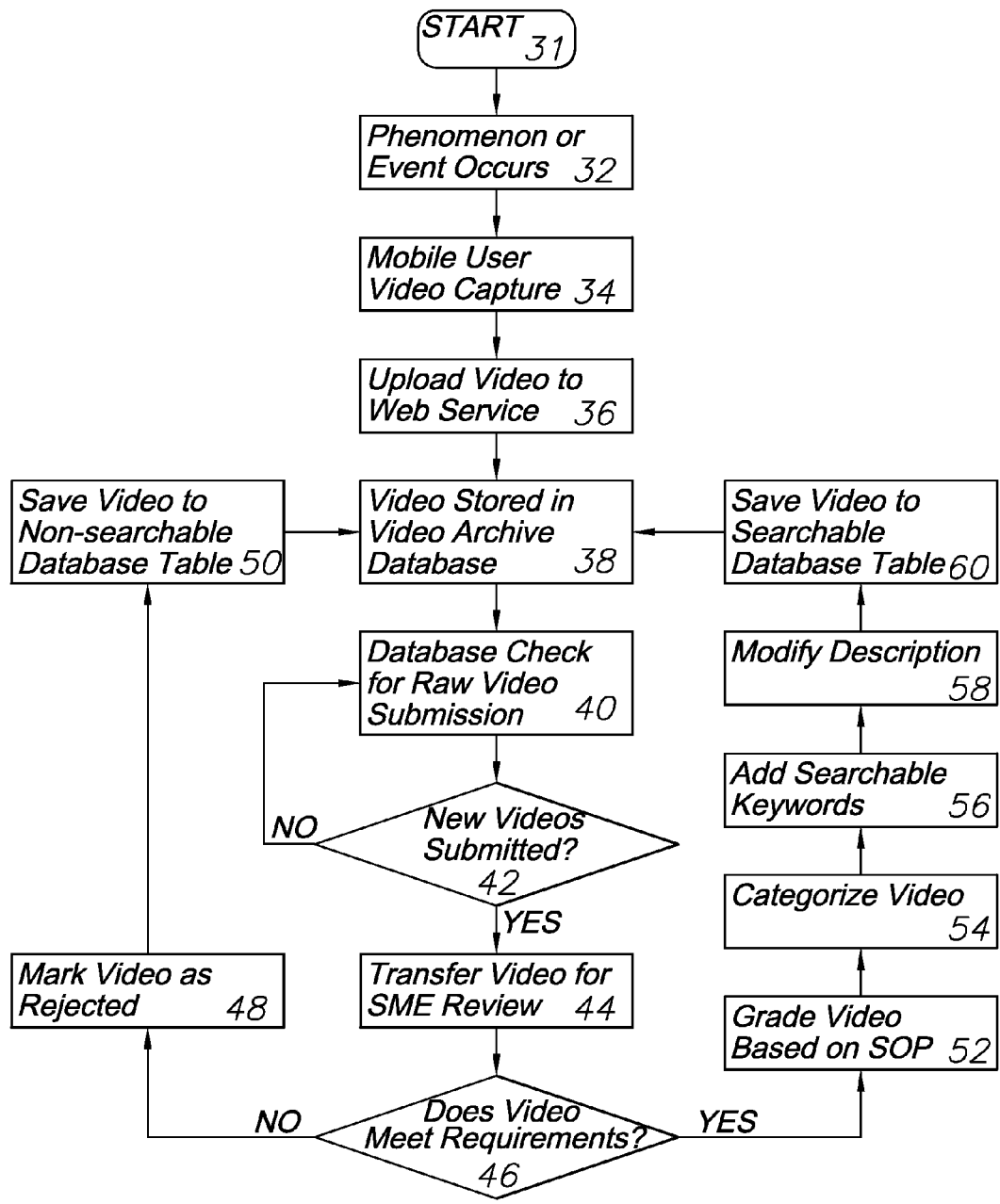
FIG. 2 is a flowchart showing the practice of a method of the preferred embodiment of the present invention.

FIG. 2 demonstrates the practice of the above method in more detail. This will start at 31 when a phenomenon or event occurs at 32. A mobile user will use their mobile device to capture video of the event at 34 and will upload that video to the database server at 36. As explained above, the video will be uploaded in slices and will be saved to the archive database at 38 for further review.

The database will check for raw video submissions at 40 and will determine if a new video has been uploaded or submitted to the server at 42. If no new video data has been uploaded or submitted, the process continues checking the database for new submissions.

Upon detecting a new video submission, the video will be transferred to the expert for review at 44. The expert checks to determine if the video meets the back-end application requirements at 46. These requirements may include video relevance, video quality, and whether similar videos have already been uploaded for a single event. If the video does not meet all requirements, the video is marked as "rejected" at 48, saved into a non-searchable database table at 50, and stored in the video archive database at 38.

If the expert determines that the video meets all requirements, the expert will then grade the video based on standard operating procedures at 52. The video will be categorized at 54 to allow for easy searching of the video through the user web application. Categories may include video location, event description, or other defining terms that will allow end users to easily search for and find the relevant video. Searchable keywords are also added to the video at 56, which will simplify the video search that will return the particular video being reviewed. The video description will be modified at 58, if needed. This may be performed if, for example, the mobile user who uploaded the video incorrectly described the video in question. Finally, the video will be saved to searchable database tables at 60 and stored in the video archive database at 38.

IV. Video Archive Service User Software

Figure 3:
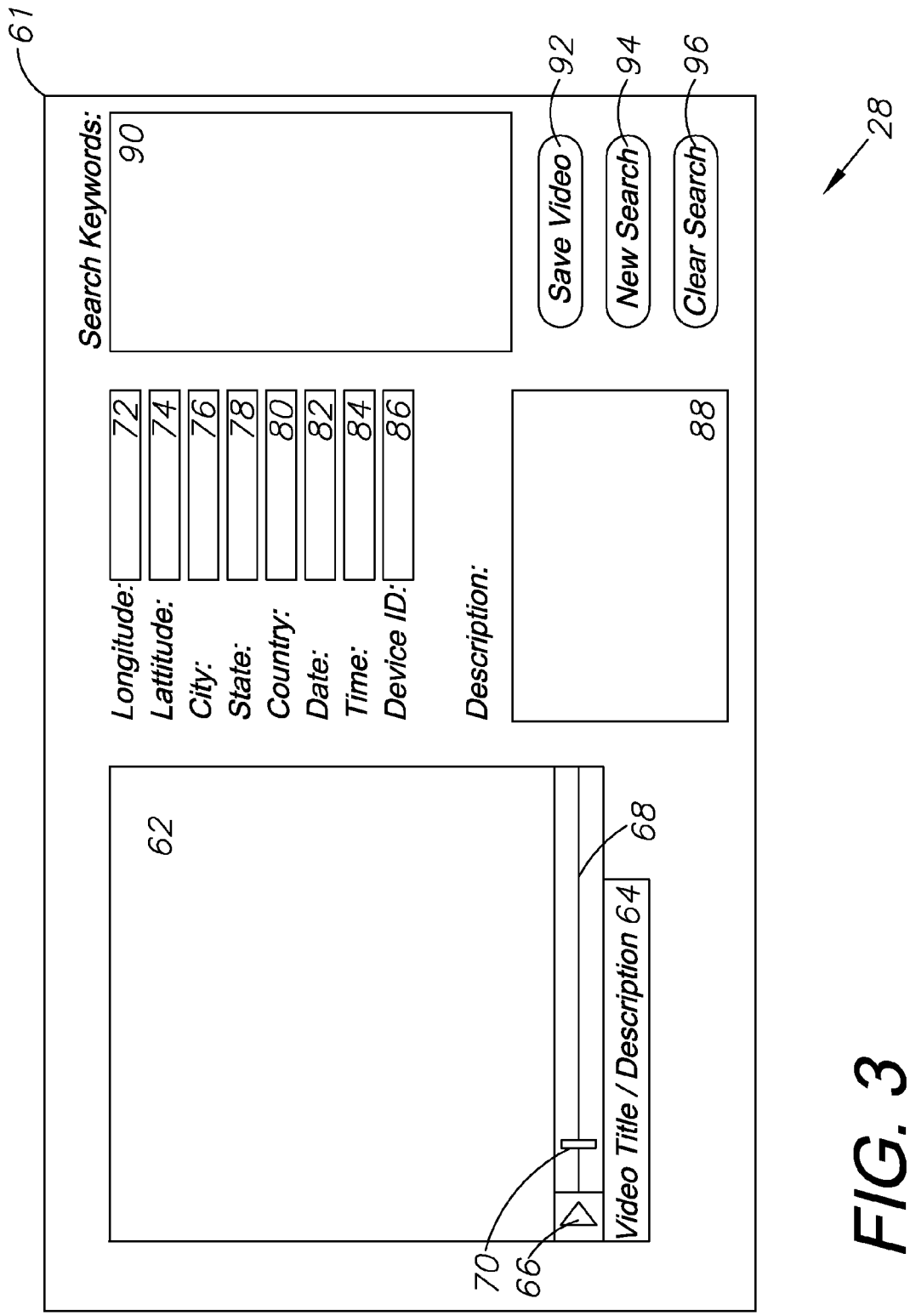
FIG. 3 is a diagram illustrative of a user interface for viewing videos on a computer utilizing the preferred embodiment of the present invention.
Figure 4:
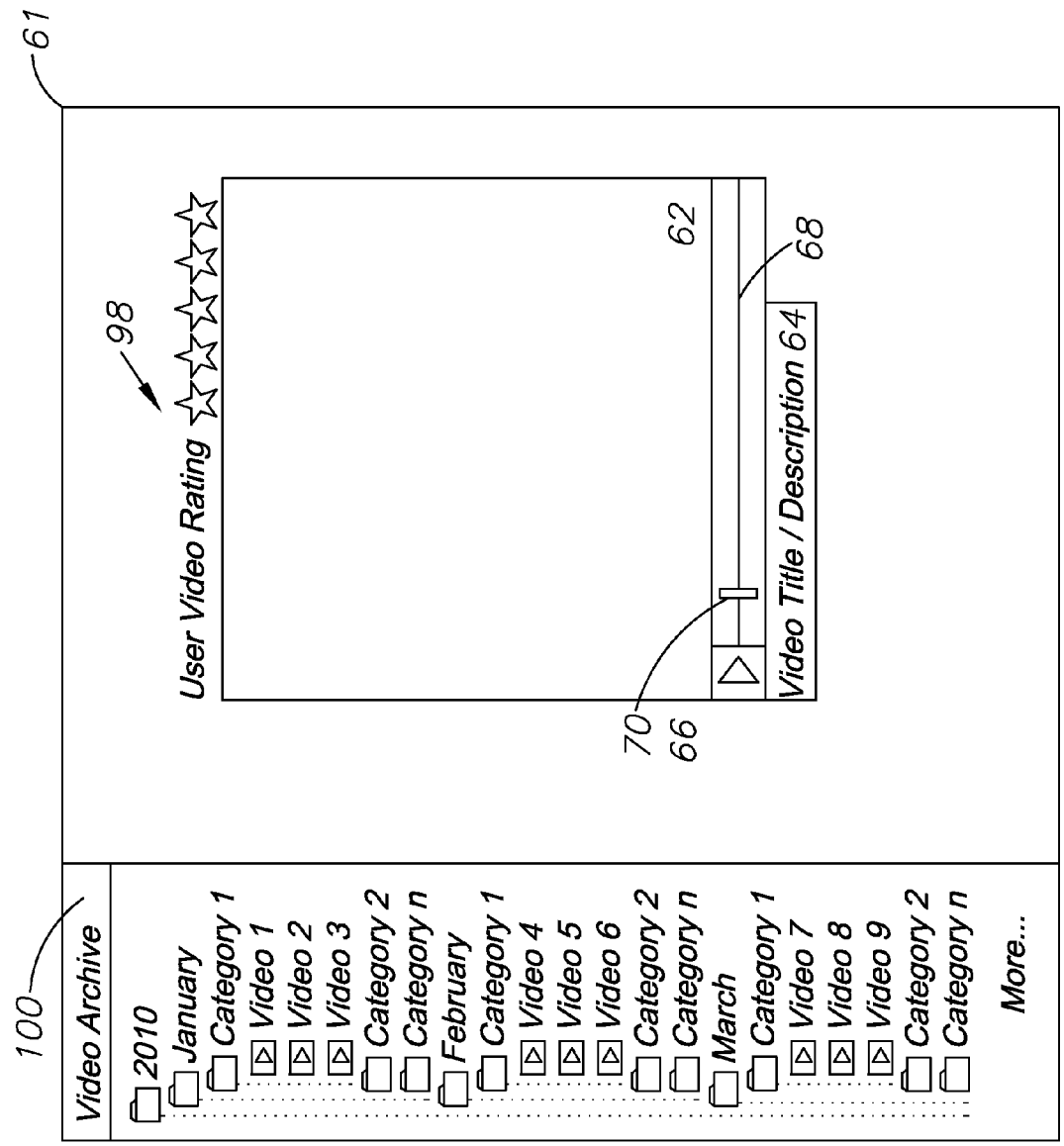
FIG. 4 is a diagram illustrative of a user interface for viewing archived video associated with the preferred embodiment of the present invention.

FIGS. 3 and 4 show the typical interface an end user 30 may see when accessing the user web application 28. The user web application 28 allows all end users 30 to have access to all reviewed and archived videos available.

In the preferred embodiment, the interface is accessed through a personal computer via the World Wide Web or some other accessible network. FIG. 3 shows a window 61 will be accessed by the end user 30. The window 61 includes a video playback 62 including a video title 64, a play/pause button 66, a play-back progress bar 68 and a progress slider 70.

Additional data uploaded along with the video data may be included in the window 61. This data may include location information about the video, such as longitude 72, latitude 74, city 76, state 78, and country 80. Additionally, date 82, time 84, and device ID data 86 may be uploaded and stored, embedded within the video data at the time the video was captured. Each of these terms will allow users to find applicable videos relating to what they are searching.

A description 88 of the video, which may be written by the original mobile user or by the expert 29, is included in the window, along with a series of search keywords 90 assigned by the expert 29. The end user 30 has the option of saving the video which results from the user's search at 92. The video may be stored locally on the end user's machine, or could be stored to the end user's profile so that the user may later return to the searched video. The end user 30 may also perform a new search 94, including pervious search terms with new terms added, or the user may clear the search 96 and start a completely new search.

FIG. 4 shows an alternative search window 61. Here, the end user 30 is capable of viewing the entire archived database list 100. In the example shown by FIG. 4, the video archive list 100 organizes the video by date and category, allowing the end user 30 to browse through all videos uploaded and saved to the database.

Along with the video playback 62, video title 62, play/pause button 66, play-back progress bar 68 and progress slider 70, the window 61 includes a user video rating 98. This rating may be assigned by the expert 29 or by end users 30 who visit the site, view the video, and rate the video. The rating will allow future users to determine if there may be a better video to watch, depending on what they may be looking for.

V. Weather Video Archive Application

In one embodiment of the present invention, the video uploaded to the database 20 relates to current weather occurring somewhere in the world. The mobile user records video of real-time weather activity with a mobile device 7, uploads this weather video to the database server 18 where it is reviewed by an expert 29, and the weather video is placed into the archive database 20 where it may be reviewed by end users 30 through the user web application 28. This allows end users to view an up-to-date weather video of any location where mobile users are uploading video from, including in the end user's immediate vicinity.

The primary section of interest of the user web application 28 will likely be an interactive map display showing various locations of un-archived video and current weather radar overlays. The user will have the ability to select the grade of video that is displayed on the map. Notifications of videos relating to specific locations will appear on the map as an overlay to indicate the location the video was captured. Hovering over the notifications will allow a brief time lapsed preview of the accompanying video. Activating the notifications will display the full video in a window 61. At this point the user will have the ability to download the full video, copy link information to embed in a web site, or other video functionality.

VI. 911-V Alternative Embodiment

An alternative embodiment video upload and archive system 102 encompasses the use of a back-end application 117 that will take video collected from a front-end mobile application 103, determine its location via longitude and latitude, and upload that information to a 911V system server 118. If the location where the video has been recorded is within a current 911V application 128 site software installation, the video is automatically routed to the appropriate emergency authority 123. If the location corresponds to a 911V application 128 site participant, the video is automatically submitted to that 911V emergency authority 123 with the location where the video was recorded. This will allow the site to immediately dispatch emergency services as needed based upon what is shown on the video.

If the location is not a participant in 911V, a call center specialist 129 contacts the appropriate public safety answer point (PSAP) 130 jurisdiction, based upon the actual location determined by the longitude and latitude embedded in the submitted video. The call center specialist 129 will have the ability to email the video submitted to the 911V system 118 to the PSAP 130 for review. All 911 or 911V contact information will be saved to the videos corresponding XML metadata, for future audits and investigations if needed.

Figure 5:
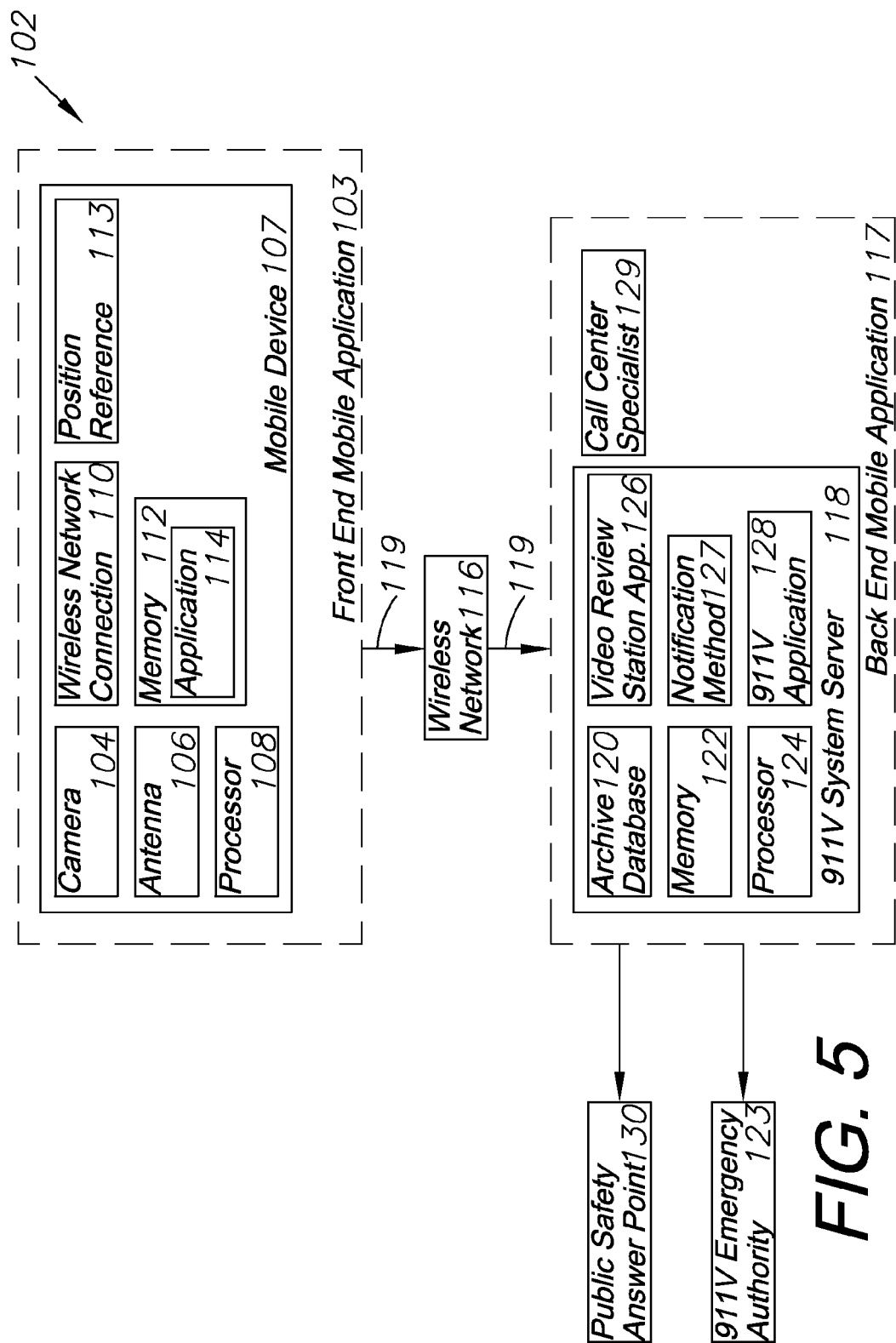
FIG. 5 is a block diagram showing the relationship between various elements of an alternative embodiment of the present invention.

FIG. 5 is a block diagram showing the interaction between the elements of the front-end mobile application 103 and the back-end mobile application 117. The front-end application 103 is comprised of a mobile device 107 including a camera 104 or other image recording device, an antenna 106, a processor 108, a wireless network connection 110, memory 112 including a stored application 114, and a position reference 113. As in the preferred embodiment, the mobile device 107 records an event with the camera 104 and transmits video data via packets 119 through a wireless network 116 to the back-end mobile application 117. Position reference 113 is necessarily included with the uploaded video packet 119 to determine where the recorded emergency is occurring and to contact the correct authorities.

The back-end mobile application 117 is comprised of a 911V system server 118 and call center specialist 129. The server 118 further includes an archive database 120, memory 122, a processor 124, a video review station application 126, a notification method 127, and the 911V application 128. The call center specialist 129 may review incoming video data and direct the video to the nearest PSAP 130, or the 911V application 128 will determine the location of the uploaded video data, determine the proper notification method 127, and automatically forward it to the nearest 911V emergency authority 123.

Figure 6:
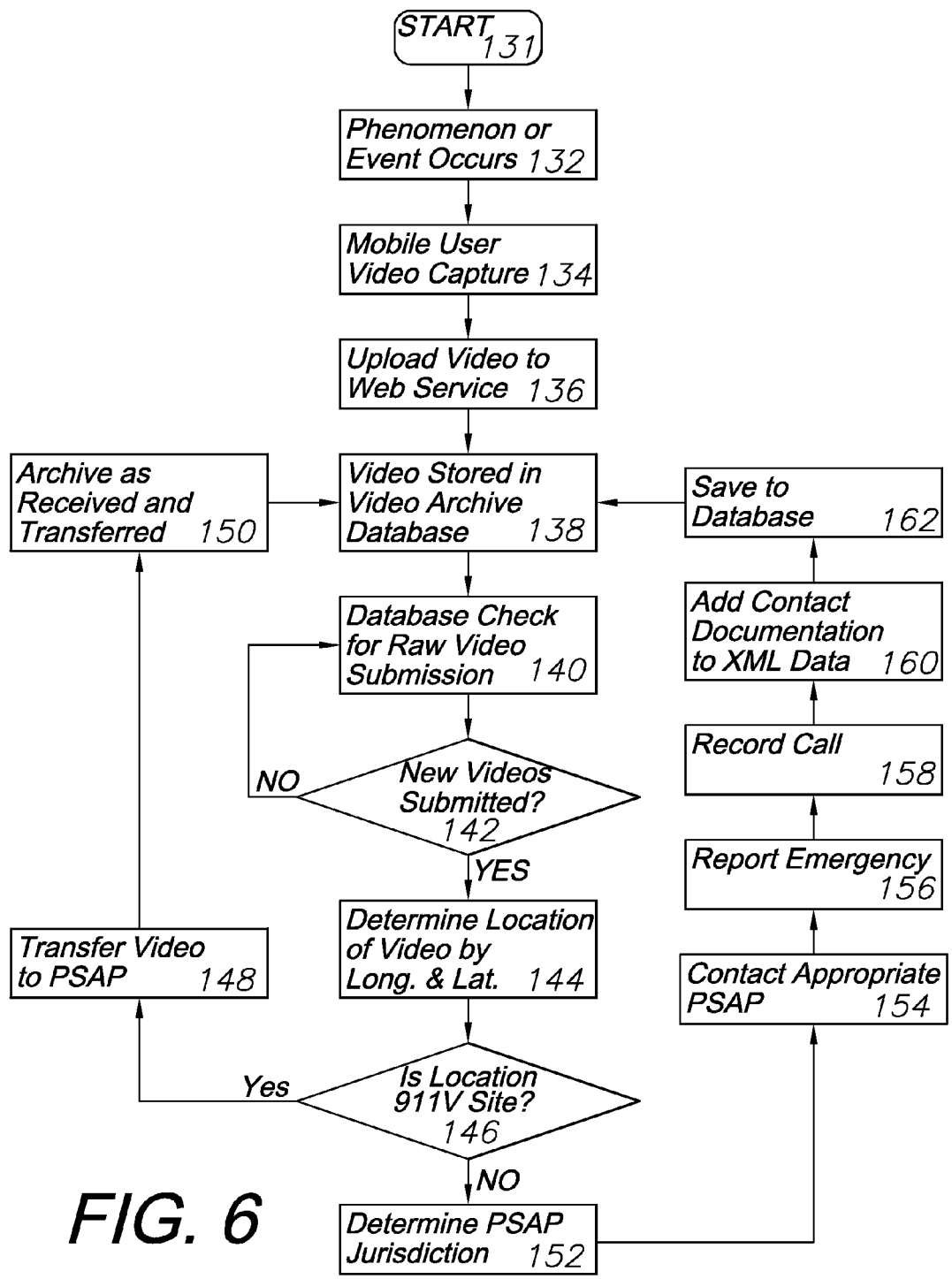
FIG. 6 is a flowchart showing the practice of a method of an alternative embodiment of the present invention.

FIG. 6 demonstrates the practice of a method of the alternative embodiment. The method starts at 131 with an emergency phenomenon or event occurring at 132. A mobile user possessing a mobile device capable of recording and uploading video data captures the video data of the emergency at 134 and uploads it to the 911V web service at 136. Video slices are stored in the video archive database at 138 as they are uploaded, and the system database checks for newly submitted raw video data at 140. If no new video is submitted between checks at 142, the process repeats until new video is detected.

Once new video is detected at 142, the system determines the location of the video by longitude and latitude at 144. The system determines whether the location of the uploaded video is a 911V site at 146.

If the site where the video was recorded is located in a 911V site, the video is transferred to the PSAP at 148 and archived as "received and transferred" at 150 and stored in the video archived database at 138.

If, however, the location where the video was recorded is not a 911V site, the call center specialist or the system itself will determine the appropriate PSAP jurisdiction to handle the reported emergency at 152. The proper PSAP is contacted at 154 and the emergency is reported at 156, including recording the call at 158 and adding contact documentation to the existing XML data at 160. All of this data is saved to the database at 162 and stored in the video archive database at 138.

It will be appreciated that the geo-location video archive system can be used for various other applications. Moreover, the geo-location video archive system can be compiled of additional elements or alternative elements to those mentioned herein, while returning similar results.

VII. Virtual Space Via Super Position (VSSP) System 202 Alternative Embodiment An alternative embodiment system includes a virtual space via superposition (VSSP) system 202 which is capable of employing the techniques and elements of the preferred embodiment disclosed above. In the VSSP system 202, multiple recording devices 206 are deployed throughout an area surrounding an incident or scene 204. Each recording device 206 may be capable of recording video and/or audio from a scene and communicating that data wirelessly to a remote database server, either directly or by sending signals to a mobile smart device 207 paired with the recording device 206.

Figure 7:
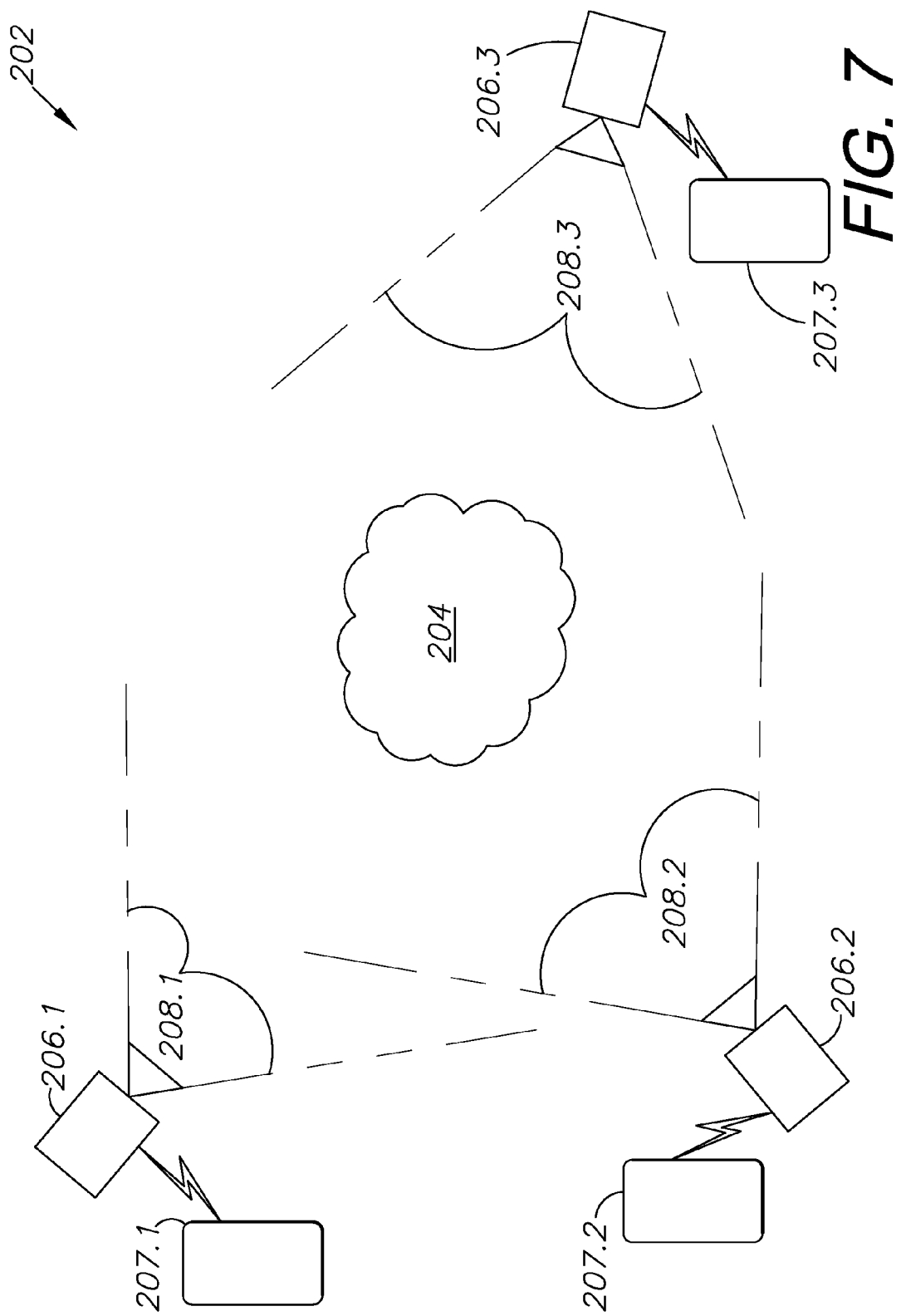
FIG. 7 is a diagrammatic representation of an alternative embodiment of the present invention.

FIG. 7 shows three recording devices 206.1, 206.2, 206.3 paired with respective mobile smart devices 207.1, 207.2, 207.3. Each recording device has a unique view or perspective 208.1, 208.2, 208.3 of the scene or incident 204 from which it records video and/or audio data of the scene. Each piece of video and audio information is uploaded to the remote database similar to the geo-location archive system disclosed previously.

These different video and audio perspectives can be layered and combined into a single data output, allowing users to later view a three-dimensional virtual representation of the scene. The users can virtually explore the entire three dimensional scene using a computing device, allowing the user to see and hear what was going on at the scene in virtual time.

Figure 8:
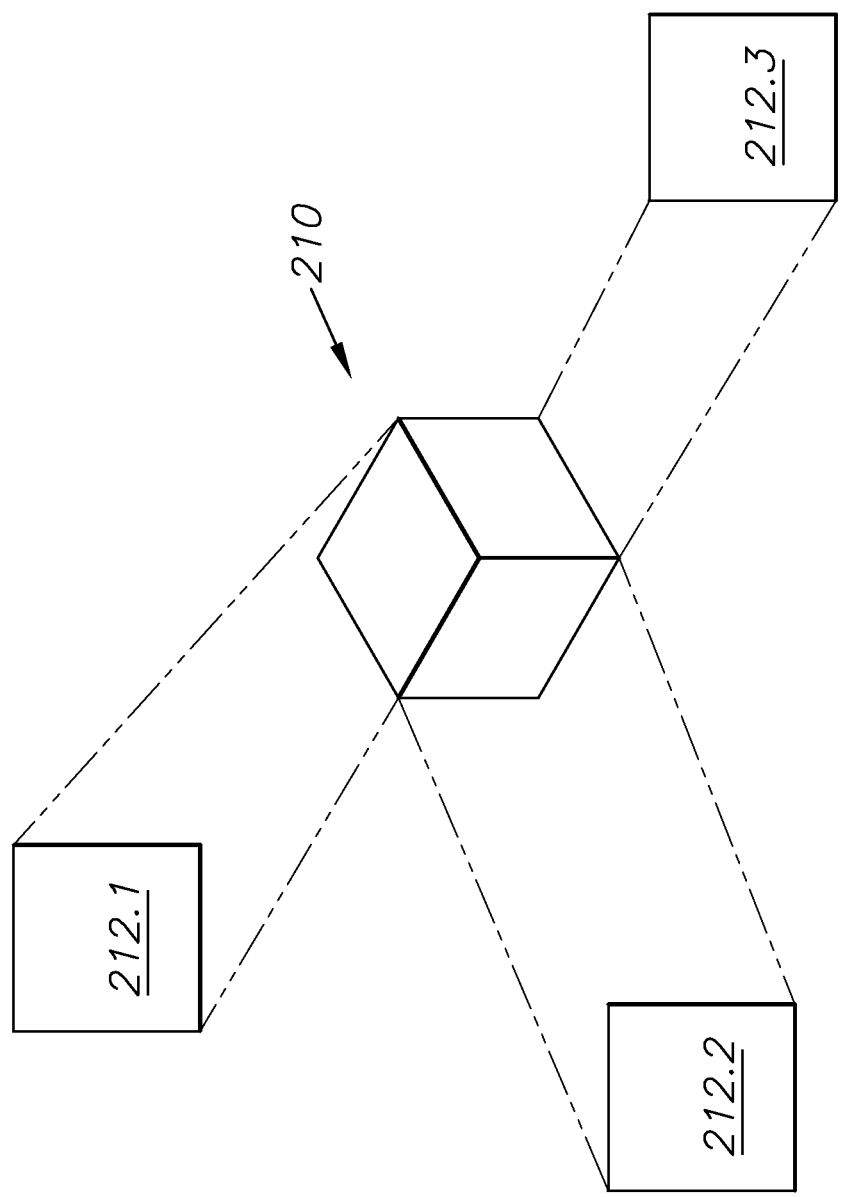
FIG. 8 is another diagrammatic representation thereof.

FIG. 8 shows this representation in a more simplified way. A three-dimensional virtual space 210 is created from data from at least three viewpoints 212.1, 212.2, 212.3. Each viewpoint may contain video and audio data, and the final three-dimensional virtual space 210 will contain video and audio data from all viewpoints.

Figure 9:
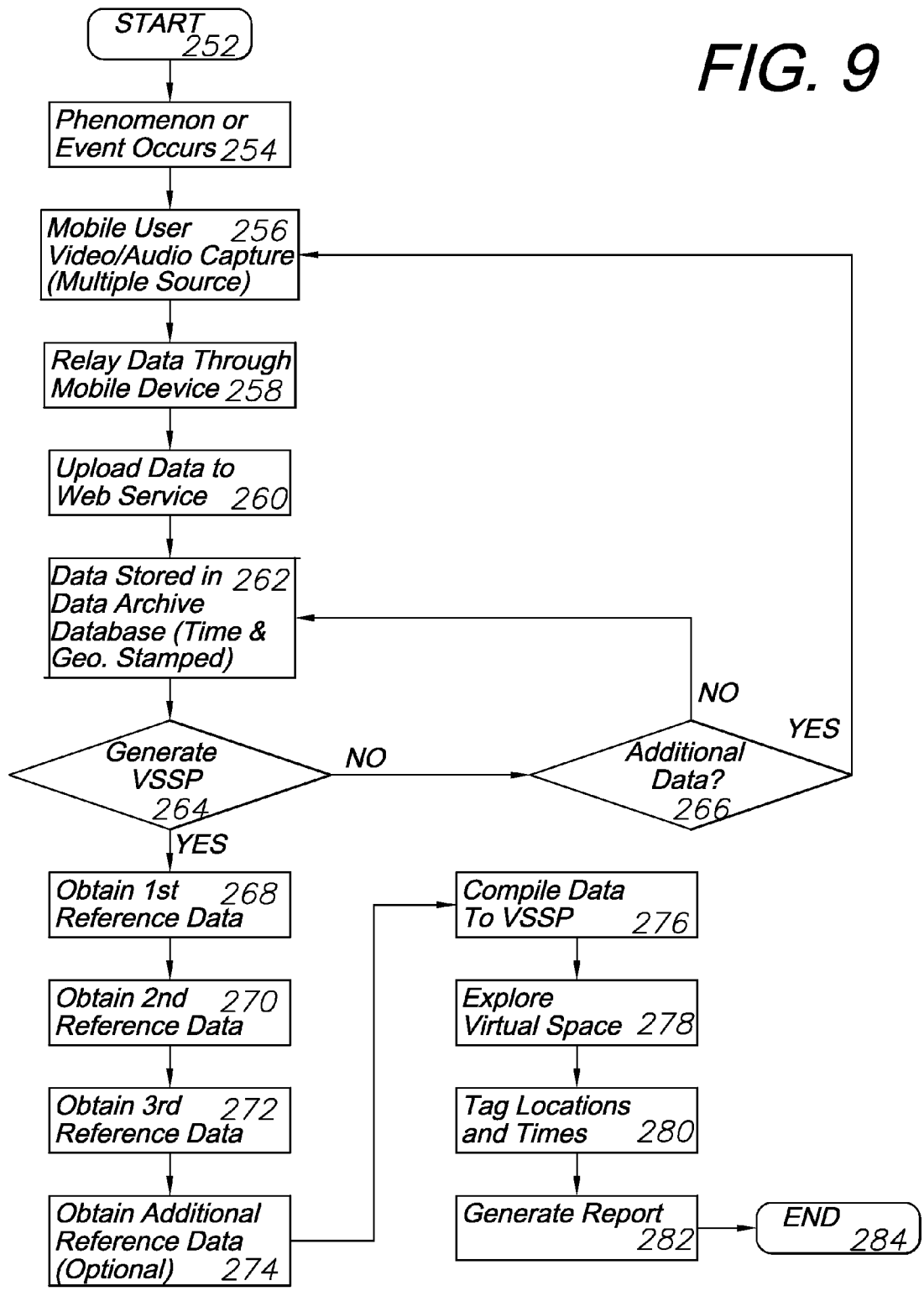
FIG. 9 is a flowchart diagramming the steps taken to practice the alternative embodiment of FIG. 7.

FIG. 9 lists the steps taken when practicing this embodiment of the present invention. The process starts at 252 and a phenomenon or event occurs or is directed to be recorded at 254. This recording may include video and audio data records from multiple recording devices 206 and/or mobile smart devices 207. Multiple mobile users capture the video and audio data at 256 using these devices, and the data is relayed through the mobile devices 207 at 258. The recorded data is uploaded to a central database via a web-based service application 260 or other software program.

Data gathered and sent in this way is stored in a data archive database at 262. All data is time and geographically stamped as accurately as possible. Having time and three dimensional geographic location data allows multiple data references to be layered together to generate a three-dimensional virtual representation of the event or scene.

A user may determine to generate a VSSP at 264 using the reference data collected at the scene. If the user does not determine to generate a VSSP, the system may request or be instructed that additional scene data is needed at 266. This may occur if certain viewpoints are corrupted, blurry, or otherwise unusable. Additional video capture from a third or more reference points may then be collected to add to the VSSP. If this is required the steps loop back to step 256 where video and audio are capture. It should be noted that the time factor of the newly recorded data will not be in synch with previously recorded data, and so much be spliced with this in mind with the preexisting data. If additional data is not required at 266, the data remains stored in the archive database until needed at 264.

If a VSSP is generated at 264, the system will pull together the first set of reference data at 268, the second set of reference data at 270, the third set of reference data at 272, and additional reference data at 274. At least three sets of reference data are needed to create a true, three-dimensional virtual space and to triangulate video and audio.

The at-least-three reference data sets are compiled at 276 to generate the VSSP. This creates a completely explorable virtual space which may be explored in real time or rewound or sped up as needed. The virtual space will be explored at 278, and users may tag locations in the virtual space as well as times where video are audio cues are deemed important at 280, and a final report may be generated at 282 indicating the user's findings. The process ends at 284.

The virtual space provides investigators, journalists, film directors, or any person interested in reviewing a scene, event, or incident with enhanced means of exploring a space which previously has been unavailable. The user will be able to review the entire three dimensional space as if the event was occurring again, and may speed up, slow down, or even reverse time as needed to explore multiple viewpoints of the scene.

One likely use of this VSSP system would be for First Responders and Military (FRAM-X) use. The recording devices 206 would likely be sturdy, high-quality stand-alone devices which may either store data for upload to the database later or, as mentioned above, be tethered to a smart device 207 which can wirelessly transmit the recorded data as it is being recorded.

As an example, if multiple police officers are wearing the recording devices 206 during an incident, the incident can be highly scrutinized from multiple angles at a later date, even if one officer's recording equipment malfunctions.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A video archival system comprising:
   a computer network capable of receiving and transmitting data;
   at least three recording devices each capable of storing video and audio data;
   each said at least three recording devices wirelessly tethered to a respective one of a plurality of mobile personal computing devices, each including a camera configured for collecting video data, an antenna, a processor, memory storage storing a first front-end mobile application, and a positional reference device;
   said mobile personal computing devices wirelessly connected to said computer network such that it is capable of delivering data from said mobile device to said network;
   a stationary computing device including a database server with memory storage storing a second back-end mobile application, a processor, and an archive database;
   said stationary computing device connected to said computer network such that it is capable of delivering data from said mobile device to said network;
   wherein video and audio data recorded by said at least three recording devices is transmitted from said plurality of multiple personal computing devices to said computer network and is received by said stationary computing device and stored in a front-end mobile application of said system stored on a remote computing device;
   an emergency services dispatch application connected to said network and configured for dispatching emergency services;
   multiple site software installations installed on each said mobile computing device, each said site software installation configured for identifying a respective site location;
   wherein data slices including said video data are transmitted from said plurality of multiple personal computing devices to said computer network and are received by said stationary computing device and stored onto said archive database in said front-end mobile application of said system;
   characteristic data embedded into said video and audio data, said characteristic data capable of identifying the mobile personal computing device from which it originated;
   wherein said slices are stored in said archive database based upon which mobile device said slices originated;
   wherein said slices are stored such that adjacent sections of captured video-data are contiguous;
   a review software application configured to access said video and audio data stored in said archive database, said review software application configured to compile said video and audio data from said at least three recording devices into a compiled record comprising a virtual three dimensional space accessible by said review software application;
   a computing device including a video review back-end application wherein said video data is categorized and inspected by an expert, and results of said categorization and inspection are embedded into said video data;
   said computing device video review back-end application including a determination of location via longitude and latitude using video collected from said front-end mobile application;
   said computing device video review back-end application determining if the video data is within a current said site software installation and routing the video data to an appropriate emergency authority with the location of said current site software installation;
   if said video data is not within a current site software installation, said system routing the recorded video data to a call center specialist for contacting an appropriate public safety answer point jurisdiction for an emergency response based upon the location of the submitted video data;
   wherein said compiled record is explorable in three dimensions;
   wherein said compiled record is further explorable based upon recording time;
   said computing device video review back-end application determining if the compiled record is within a current site software installation and routing the compiled record to an appropriate emergency authority with the location; and
   if said video is not within a current site software installation, routing the compiled record to a call center specialist for contacting an appropriate public safety answer point jurisdiction review of the compiled record.

2. The system of claim 1, wherein said video and audio data includes location via longitude and latitude.

3. The video archival system of claim 1, further comprising:
   wherein said camera is capable of capturing high-resolution video data; and
   wherein said high-resolution video data is stored onto said mobile personal computing device memory.

4. The video archival system of claim 3, further comprising:
   said high-resolution video data recorded and stored in slices, and wherein said slices are between one and ten seconds long;
   said first mobile application adapted to instruct said mobile personal computing device to transmit said slices to said computer network; and said stationary computing device adapted to receive said slices from said computer network and store those slices onto said archive database.

5. The video archival system of claim 1, further comprising:
wherein said mobile device processor produces date-stamp and time-stamp data when said high-resolution video data is captured; and
wherein said date-stamp and time-stamp data are embedded into said high-resolution video data at the moment said video is captured.

6. The video archival system of claim 4, further comprising:
wherein said positional reference device is a global positioning system (GPS) capable of reporting geographic coordinates; and
wherein the GPS coordinates of said mobile personal computing device are embedded into said high-resolution video data at the moment said video is captured.

7. The video archival system of claim 1, further comprising:
a remote user application stored on said stationary computing device and accessible by remote users connected to said computer network; and
wherein said video data uploaded to said archive database is accessible and viewable by said users at remote locations.

8. A method of archiving data, the method comprising the steps:
wirelessly tethering each one of at least three recording devices to a respective one of a plurality of mobile personal computing devices, each said mobile personal computing device including a camera, an antenna, a processor, memory storage storing a first mobile application, and a positional reference device;
providing a stationary computing device including a database server with memory storage storing a second mobile application, a processor, and an archive database;
connecting said mobile computing devices and said stationary computing device to a computer network;
recording video and audio data with said at least three recording devices;
wirelessly transferring said recorded video and audio data from said at least three recording devices to said plurality of mobile personal computing devices;
transmitting said video and audio data from said mobile devices to said computer network;
receiving said mobile data from said computer network with said stationary computing device;
storing said video and audio data onto said archive database;
accessing said video and audio data with a review software application;
compiling said video and audio data into a compiled record comprising a virtual three dimensional space based upon longitude and latitude data associated with said video and audio data;
accessing said compiled record data and exploring said virtual three dimensional space with said stationary computing device;
said stationary computing device including a review back-end application wherein said compiled record is categorized and inspected by an expert, and results of said categorization and inspection are embedded into said compiled record;
said computing device video review back-end application including a determination of location via longitude and latitude using video collected from said front-end mobile application;
said computing device video review back-end application determining if the compiled record is within a current site software installation, routing the compiled record to an appropriate emergency authority with the location; and
if said video and audio data is not within a current site software installation, routing the compiled record to a call center specialist for contacting an appropriate public safety answer point jurisdiction for review.

9. The method according to claim 8, wherein each said recording device is capable of capturing high-resolution video data, the method further comprising the step:
storing high-resolution video data onto said mobile personal computing device memory.

10. The method according to claim 9, further comprising the steps:
transmitting said high-resolution video data from said mobile device in a plurality of slices, wherein each slice contains between one and ten seconds of video data; and
storing said slices onto said archive database.

11. The method according to claim 10, further comprising the steps:
embedding characteristic data into said slices, said characteristic data identifying the mobile personal computing device from which said slice originated;
storing said slices in said archive database based upon which mobile device said slices originated; and
storing said slices such that adjacent portions of captured video-data are contiguous.

12. The method according to claim 11, further comprising the steps:
producing date-stamp and time-stamp data at the time said high-resolution video is captured; and
embedding said date-stamp and time-stamp data into said high-resolution video data.

13. The method according to claim 12, wherein said positional reference device is a global positioning system (GPS) capable of reporting geographic coordinates, the method further comprising the steps:
producing GPS coordinates using said positional reference device; and
embedding said GPS coordinates into said high-resolution video data.

14. The method according to claim 11, further comprising the steps:
providing a video review application capable of accessing said high-resolution video data;
providing access to said video review application to an expert;
receiving categorization and inspection data from said expert; and
embedding said categorization and inspection data into said high-resolution video data.

15. The method according to claim 11, further comprising the steps;
providing a remote user application;
storing said remote user application onto said stationary computing device memory storage;
providing access to said remote user application to a plurality of remote users; and allowing stored high-resolution video data to be viewed by said remote users via said user application.

\* \* \* \* \*